United States Patent
Aono

(10) Patent No.: US 6,574,017 B1
(45) Date of Patent: Jun. 3, 2003

(54) WAVELENGTH DIVISION MULTIPLEX TRANSMITTER

(75) Inventor: Yoshiaki Aono, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/225,183

(22) Filed: Jan. 4, 1999

(30) Foreign Application Priority Data

Jan. 5, 1998 (JP) .......................... 10-000120

(51) Int. Cl.$^7$ .......................... H04B 10/08; H04J 14/02
(52) U.S. Cl. .................. 359/124; 359/110; 359/125; 359/126; 359/127
(58) Field of Search .................. 359/124–134, 359/110

(56) References Cited

U.S. PATENT DOCUMENTS

| | | | | |
|---|---|---|---|---|
| 5,463,487 A | * | 10/1995 | Epworth | 359/124 |
| 5,894,362 A | * | 4/1999 | Onaka et al. | 359/110 |
| 5,933,262 A | * | 8/1999 | Sasagawa | 359/127 |
| 5,995,276 A | * | 11/1999 | Tajima et al. | 359/341 |
| 6,025,941 A | * | 2/2000 | Srivastava et al. | 359/119 |
| 6,072,601 A | * | 6/2000 | Toyohara | 358/484 |
| 6,115,157 A | * | 9/2000 | Barnard et al. | 359/124 |
| 6,134,034 A | * | 10/2000 | Terahara | 359/124 |
| 6,185,022 B1 | * | 2/2001 | Harasawa | 359/124 |
| 6,271,945 B1 | * | 8/2001 | Terahara | 359/124 |
| 6,348,987 B1 | * | 2/2002 | Tomofuji | 359/124 |

FOREIGN PATENT DOCUMENTS

| | | |
|---|---|---|
| JP | 8-335913 | 12/1996 |
| JP | 9-261205 | 10/1997 |
| JP | 09-289503 | 11/1997 |
| JP | 5-327662 | 12/1997 |
| JP | 9-321701 | 12/1997 |
| JP | 09-321701 | 12/1997 |
| JP | 10-22980 | 1/1998 |
| JP | 10-229386 | 8/1998 |
| JP | 10-303821 | 11/1998 |

* cited by examiner

*Primary Examiner*—Leslie Pascal
*Assistant Examiner*—David Payne
(74) *Attorney, Agent, or Firm*—Scully, Scott, Murphy & Presser

(57) ABSTRACT

A wavelength division multiplex transmitter is provided, which is capable of automatically setting up the number of wavelengths and detecting a trouble in a transmission path, and so making a WDM transmission with always keeping the whole of the system at the optimum level. In a WDM system, light detection monitors are provided in the light signal input part of an AWG module, and the number of wavelengths to be multiplexed is determined based on the light input powers.

1 Claim, 3 Drawing Sheets

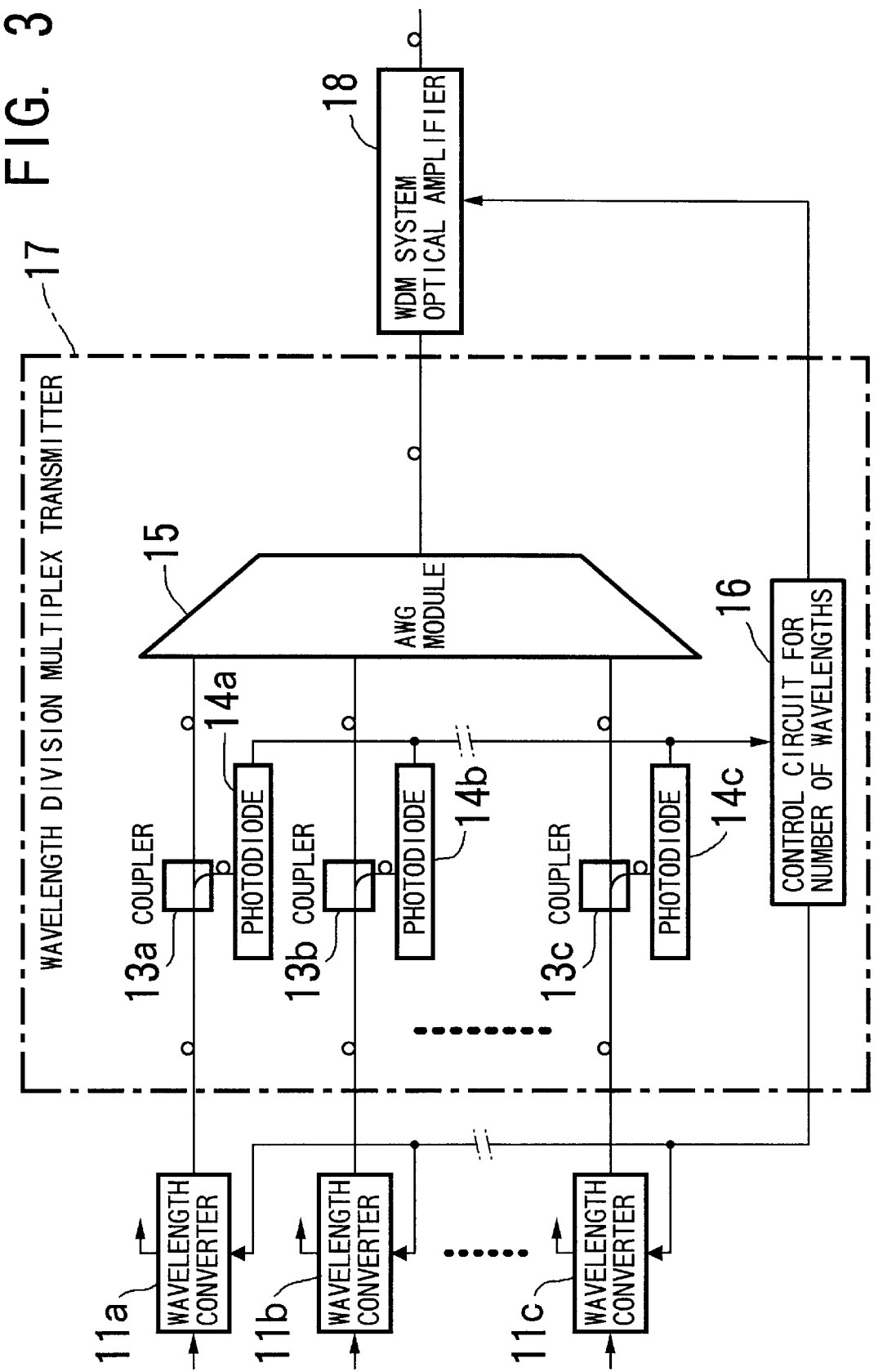

WAVELENGTH DIVISION MULTIPLEX TRANSMITTER

BACKGROUND OF THE INVENTION

1. Field of the Invention

The present invention relates to a wavelength division multiplex transmitter, and particularly to a wavelength division multiplex transmitter for use in optical transmission.

2. Description of the Related Art

In a wavelength division multiplex transmitter used in a wavelength division multiplex communication system (hereinafter called WDM system), it is necessary to set up the number of wavelengths to be used for multiplex.

In a conventional wavelength division multiplex transmitter, the number of wavelengths is determined as the sum of the number of wavelength converters provided in the wavelength division multiplex transmitter, and a user's inputting number, which is the number of lights directly to be inputted to the wavelength to division multiplex transmitter.

In such a conventional wavelength division multiplex transmitter, however, when a signal light is inputted to the wavelength division multiplex transmitter using no wavelength converter, a manual operation by the user is necessary because it has not a function of automatically setting up the number of wavelengths. It requires much labor to the user, and therefore, is inconvenient.

Besides, in the conventional wavelength division multiplex transmitter, it is impossible to control the setting-up operation of the number of wavelengths by detecting a transmission trouble between its wavelength multiplexer (hereinafter called AWG module) and a signal light source. It is therefore impossible to keep the output power of its optical amplifier at the optimum value for the WDM transmission. This causes a degradation of transmission.

SUMMARY OF THE INVENTION

It is an object of the present invention to provide a wavelength division multiplex transmitter capable of automatically setting up the number of wavelengths and detecting a trouble in a transmission path, and so making a WDM transmission with always keeping the whole of the system at the optimum level.

A wavelength division multiplex transmitter according to the present invention for use in a wavelength division multiplex communication system, comprises light detection monitors for detecting light signals inputted to a light signal input part of a wavelength multiplexer, and control means for determining the number of wavelengths to be multiplexed on the basis of the powers of the light signals detected by the light detection monitors.

BRIEF DESCRIPTION OF THE DRAWINGS

FIG. 3 is a block diagram of a wavelength division multiplex transmitter according to another embodiment of the present invention.

DETAILED DESCRIPTION OF THE PREFERRED EMBODIMENTS

The present invention will now be described with reference to drawings.

By a method of setting up the number of wavelengths, employed in a wavelength division multiplex transmitter according to the present invention, in a WDM system, light detection monitors are provided in the light signal input part of an AWG module, and the number of wavelengths to be multiplexed is determined based on the light input powers.

Figure 1:
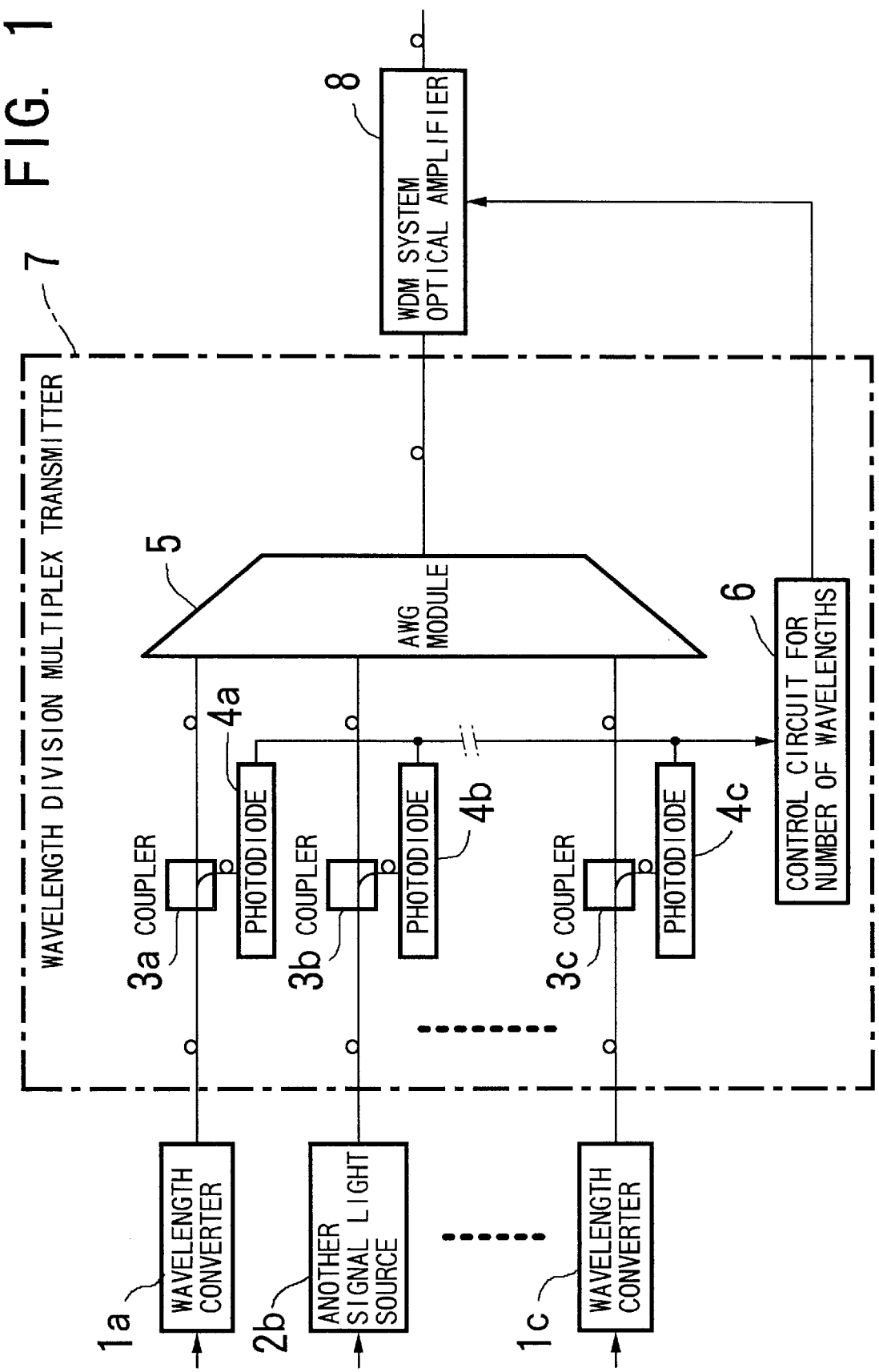
FIG. 1 is a block diagram of a wavelength division multiplex transmitter according to an embodiment of the present invention.

FIG. 1 is a block diagram of a wavelength division multiplex transmitter according to an embodiment of the present invention.

Referring to FIG. 1, the wavelength division multiplex transmitter 7 comprises couplers 3a, 3b and 3c, photodiodes 4a, 4b and 4c, an AWG module 5, and a control circuit 6 for the number of wavelengths.

Signal lights from wavelength converters 1a and 1c are inputted to the AWG module 5 through the couplers 3a and 3c, respectively. A signal light from another light source 2b, which is not a wavelength converter, is inputted to the AWG module 5 through the coupler 3b. In each of the couplers 3a, 3b and 3c, the input signal light is divided into two components, one of which is outputted to the corresponding one of the photodiodes 4a, 4b and 4c, and the other of which is outputted to the AWG module 5. A light signal into which the latter components of the above signal lights are multiplexed in the AWG module 5, is outputted to a WDM system optical amplifier 8, and then sent out to a network with a required power.

Each of the signal lights to be multiplexed is divided in the corresponding one of the couplers 3a, 3b and 3c to measure its power with the corresponding one of the photodiodes 4a, 4b and 4c. Values obtained by those measurements are collected in the control circuit 6 to be processed. In the control circuit 6, a reference value has been set up in advance, and each of the measurement values is compared with the reference value to judge the presence of input light.

That is, in FIG. 1, each of the input signal lights to be multiplexed in the AWG module 5 is divided by the corresponding one of the couplers 3a, 3b and 3c, and its input power is measured by the corresponding one of the photodiodes 4a, 4b and 4c. The data obtained by the measurement of the input power of each input signal light is sent to the control circuit 6 where the data are compared with the reference value which has been set up in advance. If it is larger than the reference value, judgement is made that an input light is present, while if the data is less than the reference value, it is judged that the input light is not present. The number of wavelengths to be multiplexed is thereby determined as the number of input lights considered present by those judgements.

Figure 2:
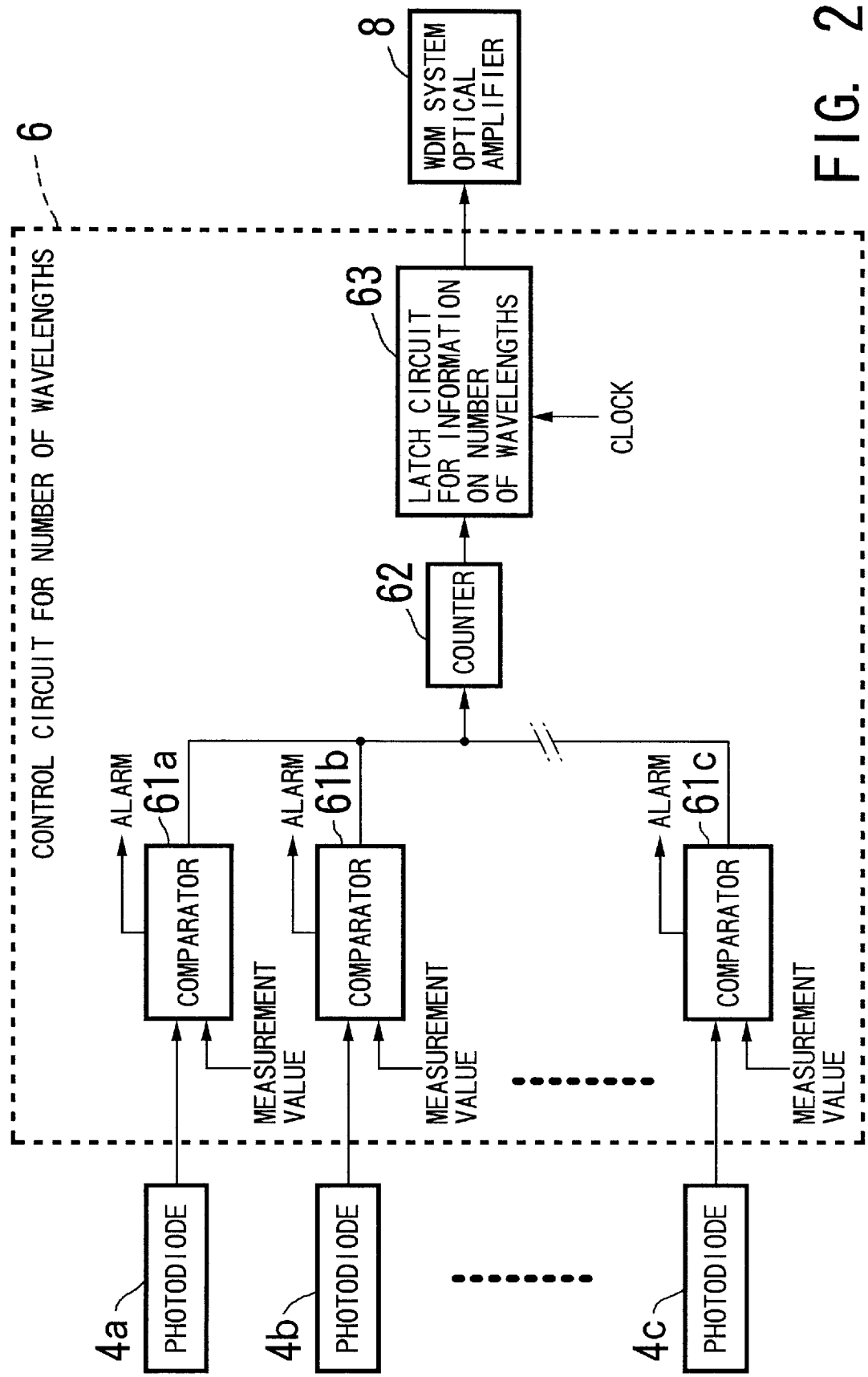
FIG. 2 is a block diagram of a control circuit of the wavelength number shown in FIG. 1.

FIG. 2 is a block diagram of the control circuit 6 shown in FIG. 1.

Referring to FIG. 2, the control circuit 6 comprises comparators 61a, 61b and 61c, a counter 62, and a latch circuit 63 for information on the number of wavelengths.

In each of the comparators 61a, 61b and 61c, a value obtained by a detection in the corresponding one of the photodiodes 4a, 4b and 4c is compared with the reference value, which has been set up in advance. Each of the comparators 61a, 61b and 61c gives an alarm if the value from the corresponding one of the photodiodes 4a, 4b and 4c is less than the base value, and outputs a count signal to the counter 62 if the value from the corresponding one of the photodiodes 4a, 4b and 4c is larger than the reference value. The counter 62 counts the count signals from the comparators 61a, 61b and 61c, and outputs the counting result to latch circuit 63. The value of the counting result is kept renewedly in the latch circuit 63.

Next, the setting-up operation of the number of wavelengths in the wavelength division multiplex transmitter of FIG. 1 will be described further.

In this embodiment, the number of wavelengths in the WDM system is determined by measuring the input power of each of the signal lights to be multiplexed.

In case of transmitting in the WDM system, the power of each signal light must be within a certain range of values set up in the system. In FIG. 2, the measurement value of each input light obtained by the measurement in the corresponding one of the photodiodes 4a, 4b and 4c is compared in the corresponding one of the comparators 61a, 61b and 61c. The comparative reference used in the comparison is set up in advance. If the power of an input light is larger than the reference value, the input light is counted up by the counter 62. If the power of an input light is less than the reference value, the input light is considered not to be present and it is not counted up in the number of wavelengths, and further, it is considered an interruption of input and an alarm is given. The data of the number of wavelengths obtained by the counter 62 is updated in the latch circuit 63 based on a clock and the newest data is always kept. It is used as data of the number of wavelengths for controlling the WDM system.

Another embodiment of the present invention will be described in detail with reference to FIG. 3.

FIG. 3 is a block diagram showing of a wavelength division multiplex transmitter according to another embodiment of the present invention.

The wavelength division multiplex transmitter 17 comprises couplers 13a, 13b and 13c, photodiodes 14a, 14b and 14c, an AWG module 15, and a control circuit 16 for the number of wavelengths.

Signal lights from wavelength converters 11a, 11b and 11c are inputted to the AWG module 15 through the couplers 13a, 13b and 13c, respectively. In each of the couplers 13a, 13b and 13c, the input signal light is divided into two components, one of which is outputted to the corresponding one of the photodiodes 14a, 14b and 14c, and the other of which is output to the AWG module 15. A light signal into which the latter components of the above signal lights are multiplexed in the AWG module 15, is output from the AWG module 15 to a WDM system optical amplifier 18, and then sent out to a network with a proper power.

Referring to FIG. 3, information on alarm is sent from the control circuit 16 to each of the wavelength converters 11a, 11b and 11c. Each of the wavelength converters 11a, 11b and 11c has functions of monitoring its output to detect an abnormal output and giving an alarm.

Besides, each of the wavelength converters 11a, 11b and 11c has a function of shutting down its output with a control from the outside, in addition to the function of giving an alarm for its abnormal output. For example, let us suppose that the power of an input light detected by a photodiode 14a has less than a predetermined level and an alarm for an interruption of input is given by the control circuit 16. At this time, if an alarm for an abnormal output is given by the corresponding wavelength converter 11a, the cause of the interruption of input can be known. If not, for example, in case of a drop of output of the wavelength converter 11a or a transmission trouble between the wavelength converter 11a and the corresponding coupler 13a (such as disconnection of an optical connector and a damage on an optical fiber), the output of the wavelength converter 11a can be shut down by the manner that an alarm given by the control circuit 16 with respect to the corresponding input to the AWG module 15 is sent to the wavelength converter 11a. It is therefore possible to control the number of wavelengths also in consideration of such a trouble in a transmission path, which was impossible in any former WDM system.

The first effect of the present invention is that, in signal lights introduced into the WDM system, signal lights which are possible to be transmitted can be distinguished from signal lights which are impossible to be transmitted. As a result, it is always possible properly to set up the number of wavelengths in the system. It is because only signal lights whose powers are possible to be transmitted are counted.

The second effect of the present invention is that, in a former WDM system, the number of wavelengths is determined as the sum of the number of provided wavelength converters, which operate as signal light sources, and a manually input number, which is the number of lights directly to input to the system, while, in the present invention, because the number of wavelengths is determined in consideration of the powers of input signal lights, it can be automatically determined independently of system construction.

The third effect of the present invention is that a transmission trouble between a signal light source and the AWG module can be known as an alarm. It is because the powers of input signal lights are always monitored.

What is claimed is:

1. A wavelength division multiplex communication system, wherein a wavelength division multiplex transmitter is provided with light detection monitors for detecting light signals inputted to a light signal input part of a wavelength multiplexer, and control means for determining the number of wavelengths to be multiplexed on the basis of the powers of said light signals detected by said light detection monitors;

said control means giving an alarm when the power of one of said signal lights detected by the corresponding one of said light detection monitors is less than a predetermined value that has been set up;

the system further comprising wavelength converters having means for receiving an alarm from said control means, and detecting a trouble in the transmission path between the wavelength converter and said wavelength multiplexer on the basis of said alarm.

* * * * *